US009829383B2

(12) United States Patent
Weiler et al.

(10) Patent No.: US 9,829,383 B2
(45) Date of Patent: Nov. 28, 2017

(54) RADIATION DETECTOR, ARRAY OF RADIATION DETECTORS AND METHOD FOR MANUFACTURING A RADIATION DETECTOR

(71) Applicant: Fraunhofer-Gesellschaft zur Foerderung der angewandten Forschung e.V., Munich (DE)

(72) Inventors: Dirk Weiler, Herne (DE); Kai-Marcel Muckensturm, Duisburg (DE); Frank Hochschulz, Ahaus (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/143,176

(22) Filed: Apr. 29, 2016

(65) Prior Publication Data

US 2016/0320240 A1 Nov. 3, 2016

(30) Foreign Application Priority Data

Apr. 30, 2015 (DE) .................. 10 2015 208 073

(51) Int. Cl.
*G01J 5/20* (2006.01)
*G01J 5/02* (2006.01)

(52) U.S. Cl.
CPC ............. *G01J 5/20* (2013.01); *G01J 5/023* (2013.01); *G01J 5/024* (2013.01); *G01J 2005/202* (2013.01)

(58) Field of Classification Search
CPC ...... G01J 2005/202; G01J 5/023; G01J 5/024; G01J 5/20
See application file for complete search history.

(56) References Cited

U.S. PATENT DOCUMENTS

| 6,034,374 A | 3/2000 | Kimura et al. |
| 7,884,328 B2 | 2/2011 | Cho et al. |
| 2009/0121136 A1* | 5/2009 | Gruss .................. G01J 5/02 250/336.1 |

(Continued)

FOREIGN PATENT DOCUMENTS

| DE | 10129846 C1 | 11/2002 |
| EP | 1072875 A1 | 1/2001 |
| EP | 2293034 A1 | 3/2011 |

OTHER PUBLICATIONS

Marichy et al., "Atomic Layer Deposition of Nanostructured Materials for Energy and Environmental Applications", Jan. 26, 2012, Advanced Materials, vol. 24, Issue 8, pp. 1017-1032.*

*Primary Examiner* — Mark R Gaworecki
(74) *Attorney, Agent, or Firm* — Perkins Coie LLP; Michael A. Glenn

(57) ABSTRACT

A radiation detector with a substrate and a membrane, which is suspended above the substrate by a spacer is described, wherein the spacer thermally insulates a radiation sensor, which is formed in the membrane, from the substrate. Further, the spacer includes a first layer, which is electrically conducting and contacts a first pole of the radiation sensor and of the substrate, and a second layer, which is electrically conducting and electrically insulated from the first electrically conductive layer and contacts a second pole of the radiation sensor and of the substrate, wherein the second pole differs in polarity from the first pole.

24 Claims, 14 Drawing Sheets

(56) References Cited

U.S. PATENT DOCUMENTS

2011/0049366 A1 3/2011 Yang et al.
2011/0266443 A1 11/2011 Schimert et al.
2014/0091217 A1 4/2014 Oulachgar et al.

* cited by examiner

RADIATION DETECTOR, ARRAY OF RADIATION DETECTORS AND METHOD FOR MANUFACTURING A RADIATION DETECTOR

CROSS-REFERENCE TO RELATED APPLICATIONS

This application claims priority from German Patent Application No. 102015208073.0, which was filed on Apr. 30, 2015, and is incorporated herein in its entirety by reference.

BACKGROUND OF THE INVENTION

The present invention relates to a radiation detector, an array of a plurality of radiation detectors and a manufacturing method for manufacturing a radiation detector, wherein the radiation detector may, for example, be a bolometer.

Uncooled resistance microbolometer (hereinafter denoted as microbolometer) arrays may be used for detecting far infrared radiation (8 μm-14 μm) and are also included within the term infrared focal plane arrays (IRFPA). Individual microbolometers, as shown in FIG. 11, may be characterized by a membrane 10, which is suspended in a vacuum over the substrate 20 by two metal contacts 15 by means of thin ridges and is thermally insulated by the ridges 22 (shown in FIG. 11). Essentially the membrane consists of an absorber 25 and a sensor layer 30. To ensure a lowest possible reflection of the incident infrared radiation, the layer resistance of the absorber layer 25 may be adapted to the wave resistance of vacuum (about 377 Ohm/sq). Furthermore, below the membrane there may be a metal layer (reflector) 35 on the substrate 20, whereby the partly transmitted radiation is reflected back and subsequently absorbed again by the upper absorber layer. The cavity 40 between the absorber layer 25 and the lower reflector forms an optical resonator. To fulfill the resonator condition (Eq. 1), the distance may be chosen so that the optical path (nd) is an odd multiple of a quarter of the main wavelength λ that is to be detected. The optical path consists of the sum of the layer thicknesses weighted with the refractive indexes of the media inside the cavity (Eq. 2). For a body having a temperature of, e.g., 300 K, the maximum spectral radiance would be about at λ=10 μm. This results in an optical path of nd=2.5 μm (k=0).

$$nd = (2k+1)\frac{\lambda}{4} (k = 0, 1, 2 \ldots ) \quad \text{(Eq. 1)}$$

$$nd = \sum n_i d_i \quad \text{(Eq. 2)}$$

Due to the absorption of the incident infrared radiation, the thermally insulated membrane 10 may heat up, which, for example, may result in a change of the electrical resistances of the sensor layer 30. Thereby, the temperature change of the membrane 10 depends on the thermal insulation by means of the ridges 22 and on the energy of the absorbed radiation and is generally smaller than change of the radiator temperature by several magnitudes. The resistance change of the sensor layer may then be determined by means of a read out circuit (ROIC).

A decisive performance indicator for microbolometers is the so-called noise equivalent temperature difference (NETD). This factor is defined as the temperature change of an object that generates a change of the measurement signal, which corresponds to the noise of the system and is therefore a measurement for the sensitivity of the sensor (Eq. 3).

$$NETD = \frac{4F^2}{A\varepsilon\pi\frac{dL}{dT}} \frac{\sqrt{\overline{u_n^2}}\, g_{th}}{U_{bias} TCR} \quad \text{(Eq. 3)}$$

F is the f-number, A the absorber area, ε the emission coefficient, L the radiance and T the temperature of the object, $\overline{u_n^2}$ the square of the overall noise voltage, $g_{th}$ the thermal conductance and $U_{bias}$ the bias voltage.

From Eq. 3 it can be seen that the NETD, amongst others, is significantly influenced by the thermal insulation of the membrane and the corresponding thermal conductance $g_{th}$, respectively. Generally, the membrane is poorly thermally insulated from the substrate by means of only the suspension on the metal contacts. In this case, the resulting thermal conductance is not sufficiently small to achieve a good performance, since the contact tubes consist of thick metal coatings due to process and stability reasons and therefore conduct the resulting heat in the membrane relatively well. The limit for the NETD should be, for example, significantly lower than 100 mK, however, it may be higher (smaller NETD values correspond to a better performance).

In conventional microbolometers, significant improvement of the thermal insulation and reduction of the thermal conductance, respectively, are realized by additional connecting elements, the ridges 22, between the suspended membrane and the metal contacts. The thermal conductance of the ridges may be determined by $$g_{ridges} = 2\frac{b_{ridge} d_{ridge}}{l_{ridge}} \sum \lambda_i \quad \text{(Eq. 4)}$$

wherein $\lambda_i$ is the thermal conductivity of the individual ridge materials, $b_{ridge}$ and $d_{ridge}$ are the width and thickness of the individual ridge materials and $l_{ridge}$ is the length of the ridges. Hence, to achieve good thermal insulation, the cross-sectional area of the ridges should be as small as possible and the ridges should consist of materials having a low thermal conductivity. Regarding the heat insulation, the proportion of the metal contacts is mostly to be neglected compared with that of the ridges. Further, the thermal insulation may be influenced by the heat radiation to the surroundings. However, as the infrared detectors are operated in the vacuum, the influence is mostly very small so that the thermal conductivity of the ridges dominates overall.

The trend in the development of microbolometers is moving towards ever smaller pixel sizes for high resolution IRFPAs with simultaneously increasing requirements in terms of performance. Currently, microbolometer arrays are generally manufactured with a pixel pitch of 17 μm. However, it is foreseeable that a new generation with a pixel pitch of 12 μm will be established over the next years. A scaling of the pixel pitch from 17 μm to 12 μm means halving the absorber area 25. Generally, miniaturization of the pixel pitch due to the reduction of the absorber area 25 may have a massive impact on the performance of the microbolometers.

The effective absorber area 25 may be limited due to the required area for realizing the ridges. Depending on design and structure of the ridges and target value of the thermal conductance, respectively, the occupied area of the ridges 22 may have a varying size. However, beside the thermal conductance, the absorber area 25 may likewise have an impact on the performance. Now, if the pixel area is decreased by a certain factor, the whole microbolometer could theoretically be scaled accordingly so that the proportions of the individual areas (ridges 22, contacts 15, absorber area 25) and distances to each other remain the same. The performance loss would then be determined, amongst others, by the scaling factor. However, the problem regarding scaling is that, here, the boundaries of lithography could be quickly reached. Typically, a stepper lithography with a resolution of 0.35 μm is used for manufacturing microbolometer arrays. Frequently, structure sizes at the limit of this resolution are already used in current but also in older microbolometer generations (17 μm, 25 μm, 35 μm), as, for example, in the ridge widths and distances. On the other hand, also due to process and stability reasons, the contact holes and upper contact areas cannot be scaled arbitrarily small so that a limit exists here as well. Due to these problems, especially the ridge areas may use more and more space relative to the pixel size at a set thermal conductance (specified by concept), whereby the effective absorber area is additionally reduced and the performance is heavily decreased.

In the literature, another arrangement has been presented, wherein the absorber layer is stretched umbrella-like over the entire pixel area. Such an arrangement is called two-layer design or, specifically, umbrella design. Hereby, it is also possible to manufacture bolometers with a large absorber area having, at the same time, good thermal insulation. However, the disadvantage herein is that the ridges and the sensor layer are still in one plane. Thus, the thermal insulation is limited by the free available pixel area. Furthermore, the resonator condition is not fulfilled in the region of the suspension of the absorber, having a negative effect on the absorption. The manufacturing process of two-layer bolometers (ridges and absorber not in one plane) is also significantly more extensive.

SUMMARY

According to an embodiment, a radiation detector may have a substrate and a membrane, which is suspended above the substrate by a spacer, wherein the spacer thermally insulates a radiation sensor, which is formed in the membrane, from the substrate; wherein the spacer includes a first layer, which is electrically conducting and contacts a first pole of the radiation sensor and of the substrate; wherein the spacer includes a second layer, which is electrically conducting and electrically insulated from the first electrically conductive layer and contacts a second pole of the radiation sensor and of the substrate, wherein the second pole differs in polarity from the first pole.

Another embodiment may have an array of inventive radiation detectors.

According to another embodiment, a method for manufacturing a radiation detector may have the steps of: providing a substrate; applying a spacer, including a first and a second electrically conductive layer, onto the substrate; suspending a membrane on the spacer above the substrate; forming a radiation sensor in the membrane; contacting the first layer of the spacer with a first pole of the substrate and of the radiation sensor; contacting the second layer of the spacer with a second pole of the substrate and of the radiation sensor, which differs in polarity from the first pole; insulating the first electrically conductive layer from the second electrically conductive layer.

The present invention is based on the idea that in the case of a membrane of a radiation detector that is suspended over a substrate by a spacer in such a manner that the spacer may electrically contact a radiation sensor formed in the membrane, the spacer may additionally function as a thermal insulation, whereby losses in the membrane area yield due to ridges for the thermal insulation may be reduced or even eliminated. The thermal insulation may be facilitated by a very thin and even layer of a contact material in the spacer, which is generated by means of, for example, ALD (Atomic Layer Deposition). The ALD layer is generated, for example, on side edges of a sacrificial layer that is structured by means of an etching process like, e.g., a DRIE process, for example a Bosch process or a cryo process. The formation of a long and thin spacer also has positive effects on the thermal insulation.

According to an embodiment, a reflector may be disposed between the substrate and the membrane. The same may rest on the substrate or be suspended over the substrate by means of additional spacers. Thereby, regardless of a length of the spacer on which the membrane is suspended, the distance between the reflector and the membrane may be adapted so that the same is an odd multiple of a quarter of a main wavelength that is to be detected. In other words, while maintaining a desired membrane reflector distance, it is still possible to choose a length of the spacer to be large to ensure sufficient thermal insulation.

According to another embodiment, additionally to the thermal insulation by means of the spacer, a ridge may also be disposed at the membrane. The ridge may further increase the thermal insulation provided that the thermal conductance to be achieved may not be achieved exclusively by means of the spacers. However, compared with a spacer that does not function as a thermal insulator, the area consumption of such a ridge is reduced and therefore the membrane area yield is increased. Further, a conventional second ridge may be omitted as the membrane is only suspended on one spacer.

Another embodiment describes a radiation detector with a functional spacer that contacts both poles of the membrane. Further, a second and/or multiple further spacers may be disposed between membrane and substrate for stabilization. The further spacers, for example, may include a thermal insulating material such as an oxide.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
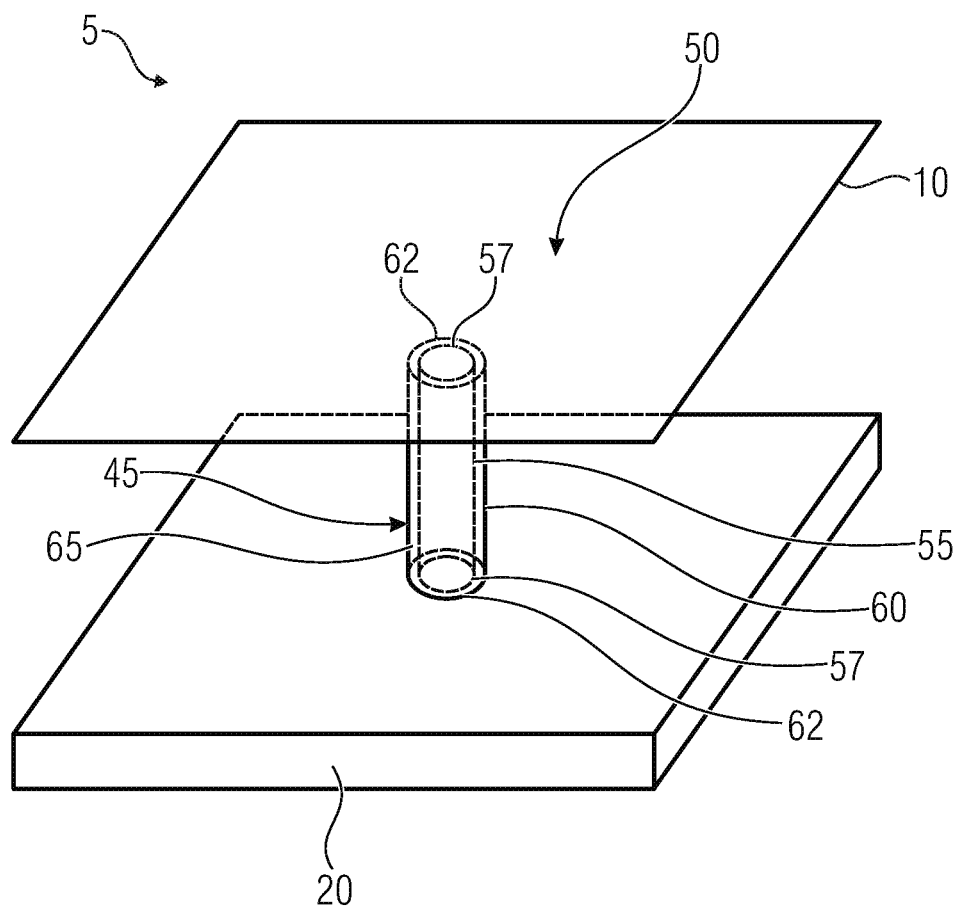
FIG. 1 shows a schematic illustration of a radiation detector with a spacer, wherein a membrane is suspended over a substrate by the spacer.

FIG. 1 shows a schematic illustration of a side view of a radiation detector 5. The radiation detector 5 includes a membrane 10 that is suspended above a substrate 60 by a spacer 45, wherein the spacer 45 thermally insulates a radiation sensor, which is formed in the membrane 10, from the substrate 20. The spacer includes a first layer 55, which is electrically conducting and contacts a first pole 57 of the radiation sensor 50 and of the substrate 20, and further, a second layer 60, which is electrically conducting and electrically insulated from the first electrically conductive layer 55 and contacts a second pole 62 of the radiation sensor 50 and of the substrate 20, which differs in polarity from the first pole 57.

According to an embodiment, the spacer 45 includes a third layer 65 between the first and the second layer 55 and 60, wherein the third layer 65 electrically insulates the first and second layer 55 and 60 from each another.

The spacer 45 may realize the thermal insulation of the membrane 10 from the substrate 20, while simultaneously electrically contacting the electromagnetic radiation detector, wherein the spacer 45 may be embodied, e.g., as a sufficiently long and thinly coated hollow tube, which, for example, may be manufactured by means of technologies and methods of microsystem technology. As described above, due to the thick metal coating, the thermal conductance of the conventional contacts and spacers 15, respectively, is very large up to now compared with the ridges 22 and does therefore not contribute to the thermal insulation. The proportion of thermal insulation amounts to less than 2%. However, if the walls of the, e.g., round spacer 45 are coated sufficiently thinly with an appropriate conductive layer such as a metal layer, a corresponding thermal conductance may result therefrom, which may be comparable to the one of the ridges and may be even significantly smaller, respectively.

Figure 2A:
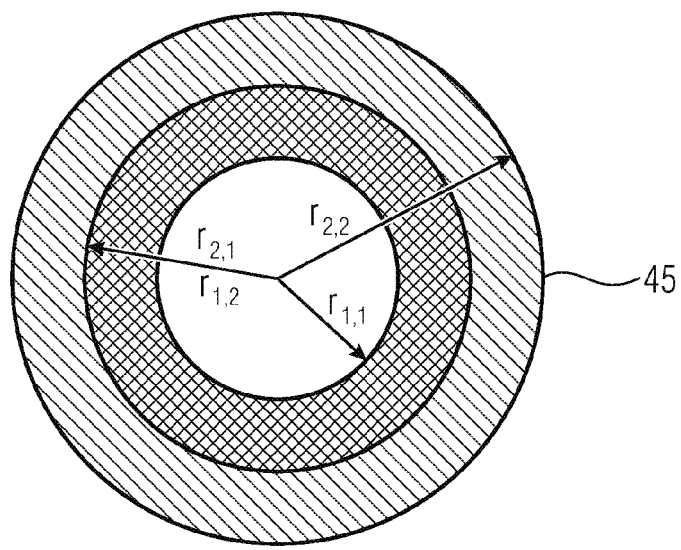
FIG. 2a shows a schematic illustration of a lateral section through a spacer, which consists of two layers of different materials and is hollow on the inside.

In FIG. 2a two layers having radii $r_{1,1}$, $r_{1,2}$ and $r_{2,1}$, and $r_{2,2}$ respectively, are illustrated exemplarily. However, that model may also be extended to a plurality of layers for the spacer 45 and serves as an exemplary illustration of a calculation of the thermal conductance of a cylinder, which consists of two layers.

The thermal conductance g of the spacer 45 may be calculated analogously to Eq. 4, wherein, in this example, as shown in FIG. 2a, annuluses form the respective cross-section areas.

$$g = \frac{\pi}{2l} \sum \lambda_i (r_{i,2}^2 - r_{i,1}^2) \quad \text{(Eq. 4)}$$

The term $r_{i,2} - r_{i,1} = d_i$ is equivalent to the thickness of the individual materials/layers inside of the contacts, l denotes a length of the spacers and $\lambda_i$ denotes the thermal conductivity of the layer i. i is therefore the index of a layer as well as the running index of the sum and has the value range $1 \leq i \leq N$, wherein N is the number of the layers. N may be any natural number. i, for example, increases from inside to outside, i.e., i corresponds to the rank of the layer from inside to outside. The second index of the radii describes the inner radius (1) as well as the outer radius (2) of a layer. Further, $r_{i,2} = r_{i+1,1}$ applies when the layers rest on each another without a gap. If the spacer 45 is configured of only one layer (N=1), the sum may only be formed of one element and is therefore omitted. Analogously, instead of the circular design, the spacers may have any other shape. Likewise, the spacers 45 may be filled, e.g., with a thermally insulating material instead of being hollow on the inside. Then, e.g., $r_{1,1} = 0$.

Similar to the ridge, the spacer 45 should also be as long as possible and consist of very thin materials/layers having a low thermal conductivity. This follows, for example, from Eq. 4. In other words, it is desirable that, when the overall diameter D of the contacts and/or spacers 45, i.e., $r_{N,2}$ (in FIG. 2 denoted as $r_{2,2}$), is chosen to be as small as possible, for example, such that a cross-section area of the spacer 45 is smaller than or equal to 7 $\mu m^2$, in another embodiment smaller than or equal to 3 $\mu m^2$ and in an embodiment smaller than or equal to 0.8 $\mu m^2$. Otherwise, many thin layers or few thick layers may form a large diameter, in both cases resulting in a larger conductance. Hence, for a lower conductance, the aspect ratio of the length l to the diameter D also needs to be taken into account. For example, the same is equal to or larger than 10, however, in another embodiment, the same may also be equal to or larger than 5 or in an alternative embodiment, the same may be equal to or larger than 1. These principles also apply to other shapes than the round spacer described herein, however, for that, Eq. 4 needs to be adapted accordingly. The cross-section of the spacer could, for example, also be square or rectangular or any other shape. Generally, for a layer i, the pair $r_{i,2}$ and $r_{i,1}$ could be chosen so that $r_{i,2}^2$ corresponds to the area that is bound by the outside of the cross-section of the layer i and $r_{i,2}^2-r_{i,1}^2$ corresponds to the area of the cross-section of layer i. $r_{N,2}$ would then correspond to a "width".

Figure 2B:
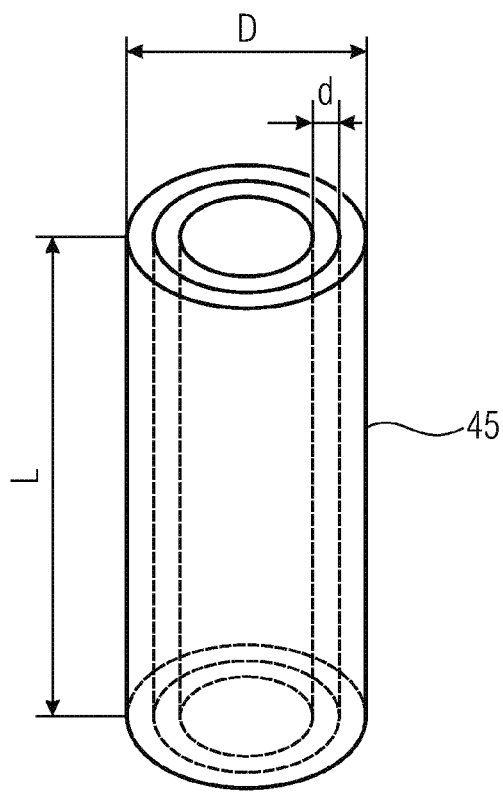
FIG. 2b shows a schematic illustration of a side view of a spacer, which consists of two layers of differing materials and is hollow on the inside.

FIG. 2b shows another dimensioning of the spacer, as it has already been used in the description of FIG. 2a.

Figure 3A:
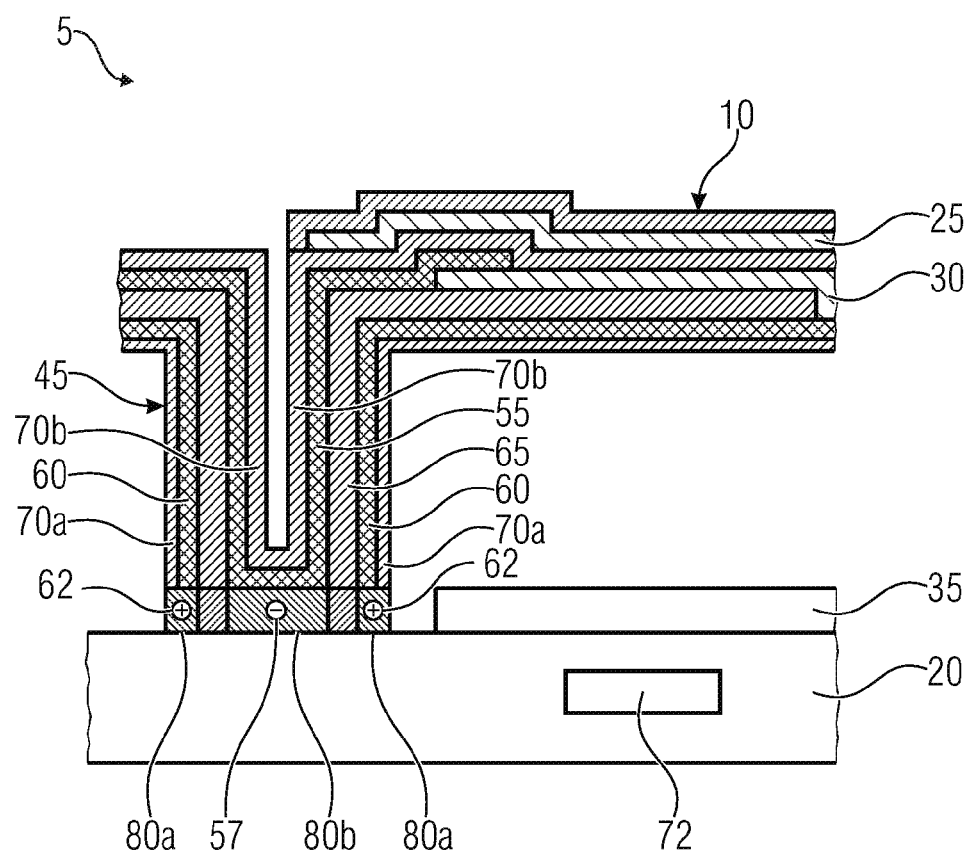
FIG. 3a shows a schematic illustration of a cross-section of a radiation detector, wherein a reflector is disposed on the substrate, and the contacting and the layers of the membrane are shown.

FIG. 3a shows an application example for the realization of the thermal insulation and contacting of electromagnetic radiation detectors by means of the spacer 45. It is a schematic cross-section of a resistance microbolometer. In this embodiment, a reflector 35, which reflects the radiation that is transmitted by the membrane 10 back onto the radiation sensor 45, is disposed on the substrate 20.

In this embodiment, the spacer 45 may include five layers 55, 60, 65, 70a, 70b, wherein the protection layers 70a, 70b are optional. The layers may be deposited, for example as described above, by means of the atomic layer deposition ALD in a sacrificial layer method. The inner and outer layers 70a and 70b has, for example, an aluminum oxide or another oxide. The inner layer 70b has, for example, a typical thickness of 18-22 nm in total and the outer layer 70a has, for example, a typical thickness of 8-12 nm. These oxide layers are to protect the inner, electrically conducting layers 55 and 60 during etching of the sacrificial layer. The electrically conducting layers 55 and 60, which may serve as contact between the readout circuit and the sensor layer, include, for example, TiN, Ti, Cu, W, Sn, Ni, Au, Al or another electrically conductive but thermally insulating material and have, for example, a typical thickness of 3-7 nm. Each of the layers 55, 60, 65, 70a, 70b has, for example, a thickness of 1 μm or less. The diameter of the spacers may, e.g., be 300-500 nm or less. Generally, e.g., even in the case of non-round spacers, the cross-section area in a first embodiment is smaller than 7 μm², in a second embodiment smaller than 3 μm² or in a third embodiment smaller than 0.8 μm². However, the same may also be larger. The length of the spacer 45 depends, for example, on the resonator condition, about 5-7 μm are, for example, typical. As described above, the resonator condition should be fulfilled for a maximum absorption of the incident infrared radiation. For this reason, the length of the spacers 45 may not be chosen arbitrarily, but should be adapted according to Eq. 1 and/or Eq. 2. Generally, the length of the spacer 45 between the substrate 20 and the membrane 10 is at least 3 μm and at the most 100 μm, the same may also lie outside this range.

Beside the thermal insulation, the second function of the spacer 45 is to electrically contact the radiation sensor 50 formed in the membrane 10. Generally, the spacer 45 consists of two electrically conducting layers 55 and 60, each of which electrically contacts a pole of the radiation sensor 50 and of the substrate 20. To protect both of the electrically conducting layers 55 and 60 during the etching process of the sacrificial layer, other protection layers 70a, 70b may optionally also be deposited with the atomic layer deposition. Further, an electrical insulation layer 65 may be applied between the electrically conducting layers 55 and 60. The protection layers 55 and 60 as well as the insulation layer 65 may be insulating electrically as well as thermally and at least the protection layers 65 and 60 may also be robust against the etching medium for the sacrificial layer. The thicknesses of all layers of the spacers are, for example, within a range of 0.1 nm-1 μm.

The membrane 10 may consist of a sensor layer 30 and an absorber layer 25, which typically comprises about 300 nm, e.g. 200-400 nm, a-Si as well as typically about 7 nm, for example 5-9 nm, TiN. However, other materials as well as layer thicknesses are possible. Below the sensor layer 30 and above the absorber layer 25 may be an aluminum oxide ($Al_2O_3$) layer 70, typically 10 nm, for example 8-12 nm, thick, which serves as protection during etching of the sacrificial layer. Again, alternatively, other materials and a differing layer thickness, respectively, are possible.

As described above, the membrane 10, which is supported by the spacers 45, may consist of an element, e.g. the sensor layer 30, which changes its electrical characteristics during application of heat, and an absorber layer 25, wherein the sensor layer 30 may include, e.g., about 200-400 nm a-Si and the absorber layer 25, for example, about 5-9 nm TiN. Below the sensor layer 30 and above the absorber layer 25 respectively, there may be an aluminum oxide ($Al_2O_3$) layer having a thickness of, e.g., 8-12 nm, which serves as protection during etching of the sacrificial layer. However, other materials as well as layer thicknesses are possible. The temperature sensitive sensor layer 30 may be realized as a temperature-dependent electrical resistor, a temperature-dependent capacitance, a temperature-dependent inductivity or a diode (pn-junction). The absorber layer 25 may be chosen so that its reflection coefficient is similar to that of air so that a smallest possible part of the incident radiation is reflected.

The substrate 20 may be manufactured, for example, from a semiconductor material. Beside the electrodes, which the spacer 45 contacts, a temperature evaluation circuit 72 may be integrated in the substrate 20. The same is for example, disposed directly below the membrane 10, however, the same may also be positioned at a different position.

Contacting of the membrane 10 may be embodied, for example, at the sensor layer 30 by the first and the second electrically conducting layer 55 and 60. To allow a lateral current flow, e.g., the first electrically conducting layer 55 may contact the sensor layer 30 in a first edge region, and further, the second electrically conducting layer 60 may contact the sensor layer 30 at a second edge region opposite the first edge region. Further, the electrically insulating layer 65 may insulate the electrically conducting layers 55 and 60 as well as the sensor layer 30 and the second electrically conducting layer 60 from each other.

Figure 3B:
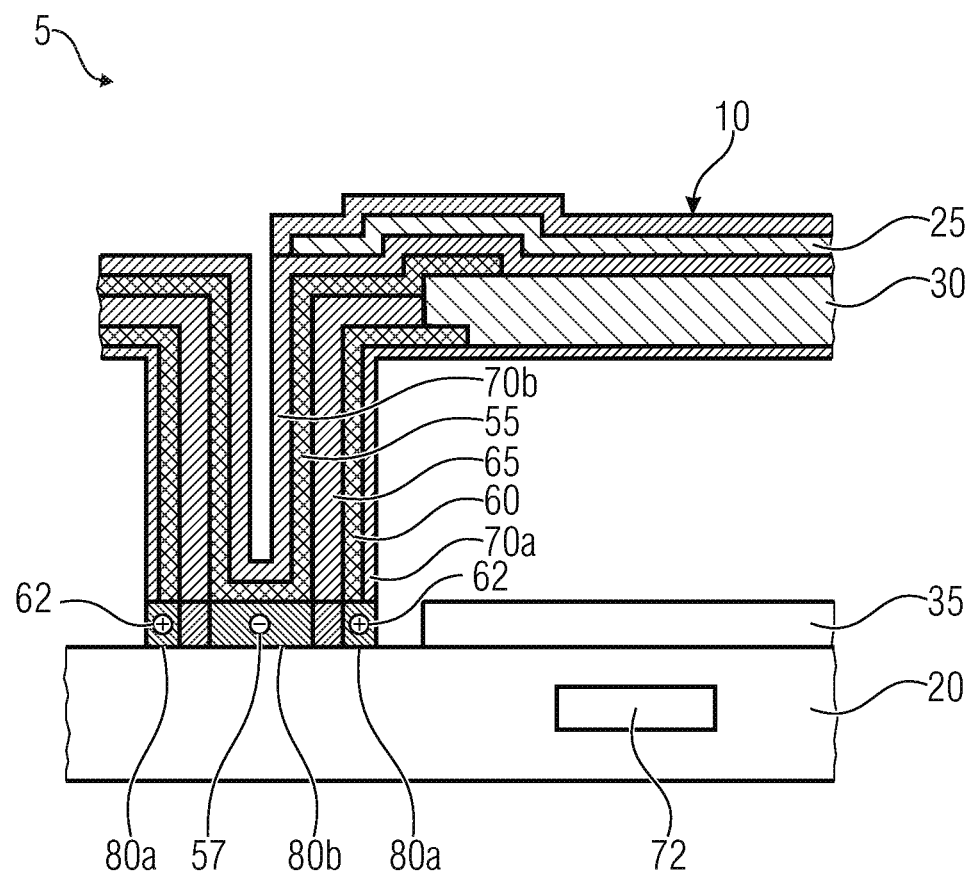
FIG. 3b shows schematic illustration of a cross-section of a radiation detector, wherein a reflector is disposed on the substrate, and the contacting as well as the layers of a membrane are shown.

FIG. 3b differs from FIG. 3a in the contacting of the membrane 10. Here, the membrane 10 may be contacted by the first electrical layer 55 and the second electrical layer 60 at a same edge region as the sensor layer 30. This arrangement of contacting may, for example, allow a current flow in a thickness direction through the sensor layer 30.

FIG. 3a and FIG. 3b further show the contacting of the spacer 45 with the substrate 20. The contacting may be accomplished by an electrode and a contact 80a, 80b, respectively, which may be divided into two parts for the formation of two oppositely polarized poles 57 and 62. FIG. 3a and FIG. 3b, respectively, illustrate the cross-section of a circular disc 80b, which forms a first pole 57, for example a negative pole. The second pole 62, for example a positive pole, may be embodied as an annulus 80a electrically insulated from the pole 57. The electrodes 80a and 80b may, for example, comprise aluminum, tungsten or another electrically conductive material. The insulation between the electrodes 80a and 80b may be achieved, for example, by an insulating material such as an oxide. Further, it is also possible to exchange the shown polarity of the poles 57 and 62.

Figure 3C:
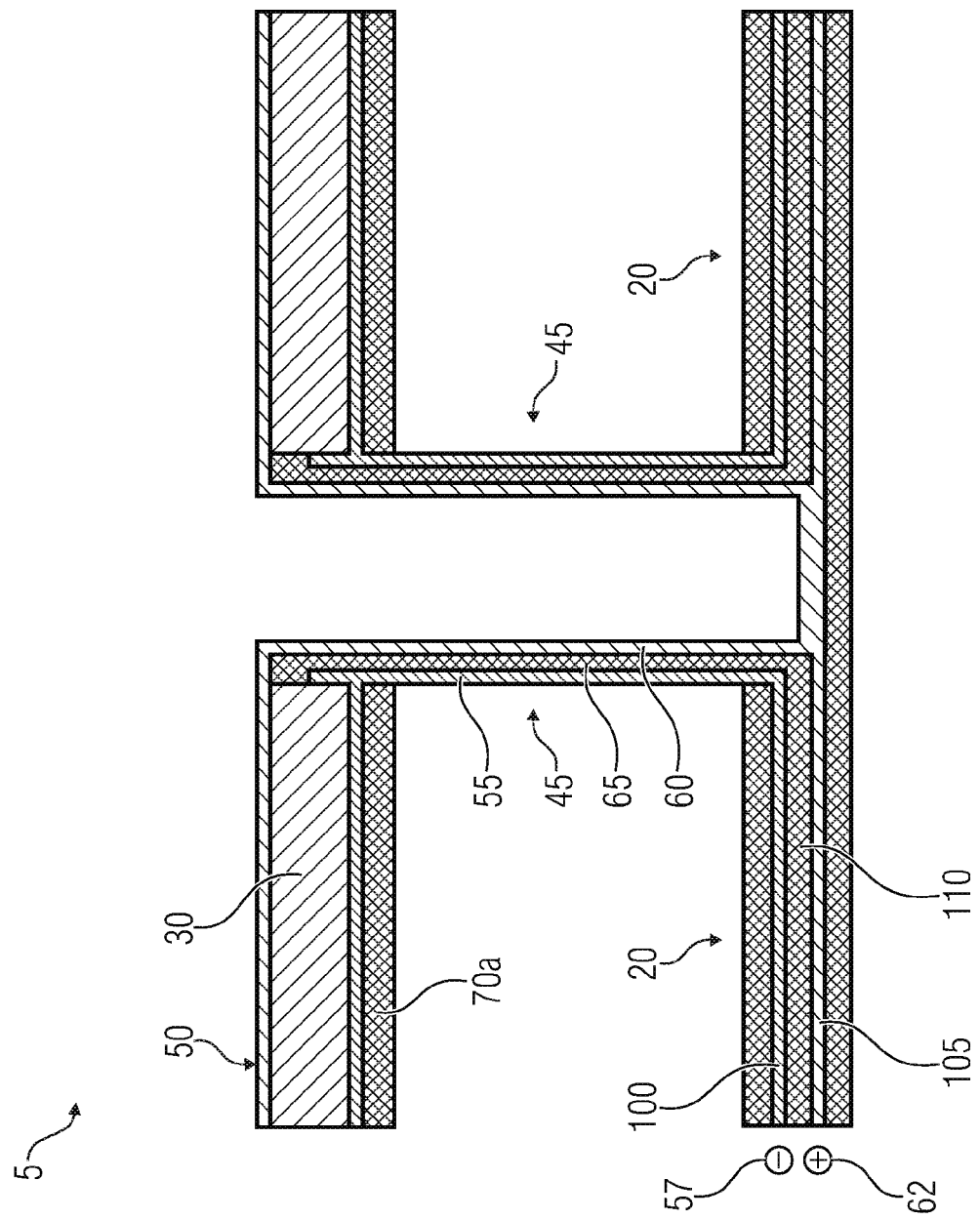
FIG. 3c shows a schematic illustration of a cross-section of a radiation detection, wherein the substrate comprises two metallization planes that electrically contact the spacer to allow a vertical current flow.
Figure 3D:
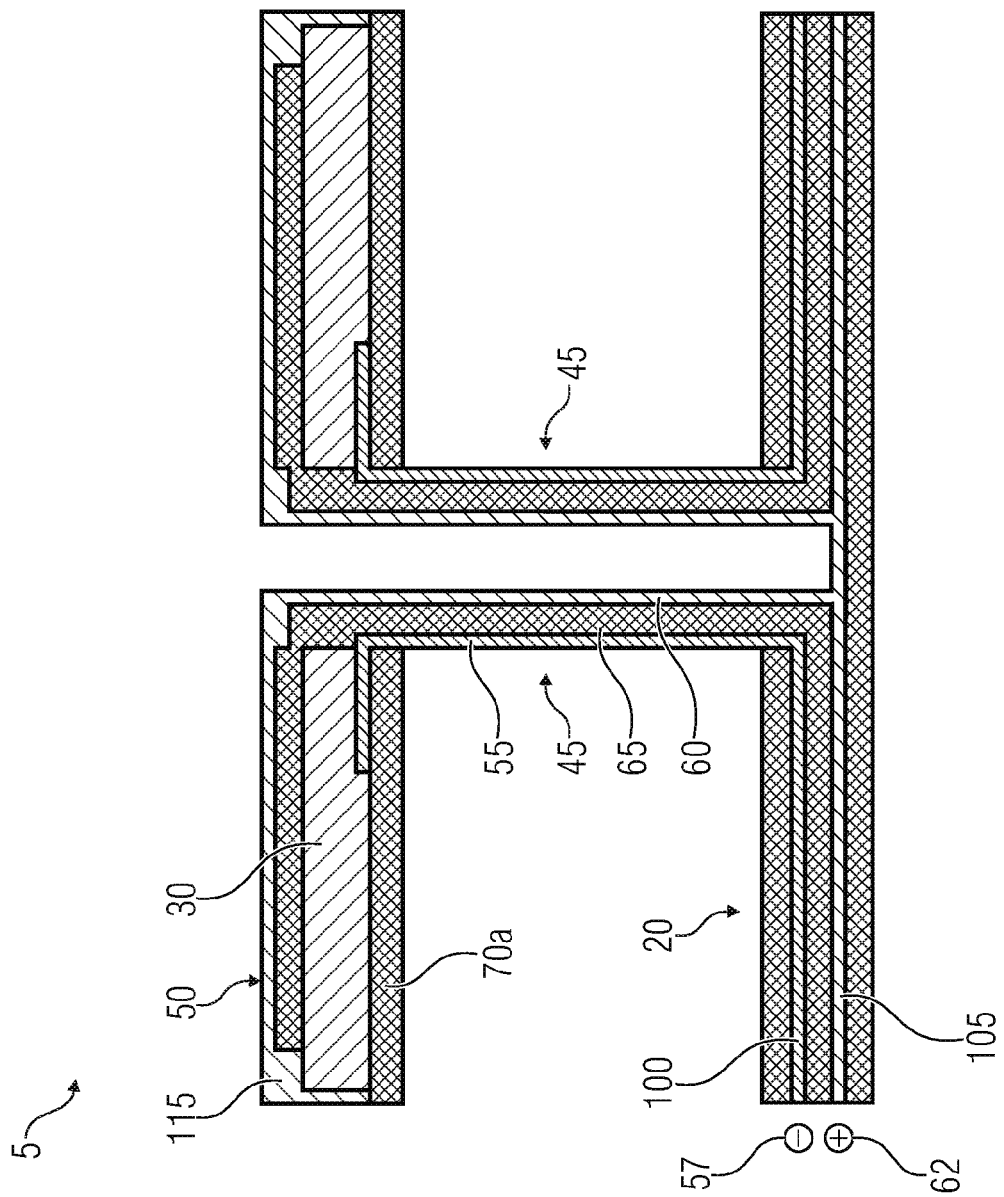
FIG. 3d shows a schematic illustration of a cross-section of a radiation detector, wherein the substrate comprises two metallization planes that electrically contact the spacer to allow a lateral current flow.

FIGS. 3c and 3d show a simplified schematic illustration of the spacer 45 according to an embodiment, wherein the spacer is contacted in two separate metallization planes 100, 105. The first layer 55, which is electrically conducting, electrically contacts, for example, the first pole 57 in the first metallization plane 100 of the substrate. The second layer 60 electrically contacts, e.g., the second pole 62 in the second metallization plane 105. The polarity of the poles 57 and 62 may also deviate from the polarity that is shown in FIGS. 3c and 3d. The metallization planes 100 and 105 may, separated by an insulation layer 110, be applied onto and into the substrate 20, respectively, for example, by means of doping. The doping and the dopants or doping atoms, respectively, may be introduced, e.g., into different depths of the substrate. Alternatively, the metallization planes are deposited on the substrate, for example, by means of PVD or another suitable process. It is also possible to generate one metallization plane by doping and the second metallization plane by depositing an electrically conducting layer onto the substrate. The insulation layer 110 may comprise the same material as the layer 65, which insulates the first and the second layer 55, 60 from each other. Further, the same may comprise a differing, electrically insulating material.

The spacer 45 electrically contacts the radiation sensor 50, especially the sensor layer 30. FIG. 3c shows a contacting that allows a vertical current flow. FIG. 3d shows a contacting that allows a lateral current flow. Further, corresponding protection layers, as shown in FIGS. 3a and 3b, may also be applied to the embodiments in FIGS. 3c and 3d. Here, as an example, the protection layer 70a is shown at the sensor, which, for example, may comprise an oxide. Further, the second electrically conducting layer 60 may contact the sensor layer 30 at the contact position 115 laterally (or "ahead of the end") and/or in a thickness direction, for example, at a main surface area of the sensor layer 30, which is facing away from the substrate. A mixture of both stated types of contacting is shown in FIG. 3d.

Figure 4:
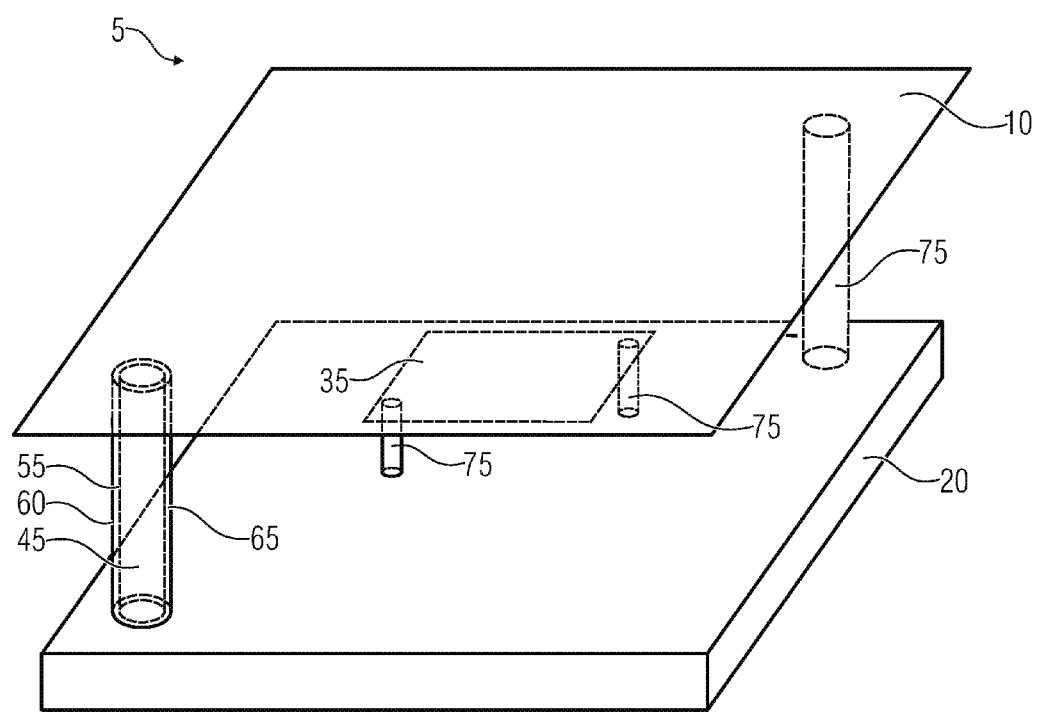
FIG. 4 shows a schematic illustration of a side view of a radiation detector, wherein the reflector is suspended on other spacers over the substrate.

FIG. 4 shows another embodiment of a radiation detector 5 in a schematic side view. In this embodiment, the restriction of the choice of length of the spacer 45 is omitted due to the resonator condition, as the reflector 35 may be realized in terms of process technology in such a manner that the optical path between the same and the absorber layer 25 is exactly a quarter or an integer multiple of a quarter of a main wavelength that is to be detected, regardless of the length of the spacer 45. This may be enabled by suspending the reflector 35 by means of further spacers 75 and therefore raising the same. The spacer 75 may then be chosen so that the resonator condition may be fulfilled.

Further, the membrane 10 may be supported, or stabilized, by a further spacer 75. The spacer 75 may consist, for example, of an insulating material such as an oxide. Therefore, the further spacer 75 may be neglected when considering the insulation between the membrane 10 and the substrate 20. Further, the usage of further spacers, which stabilize, or support, the membrane 10, is also possible.

Figure 5:
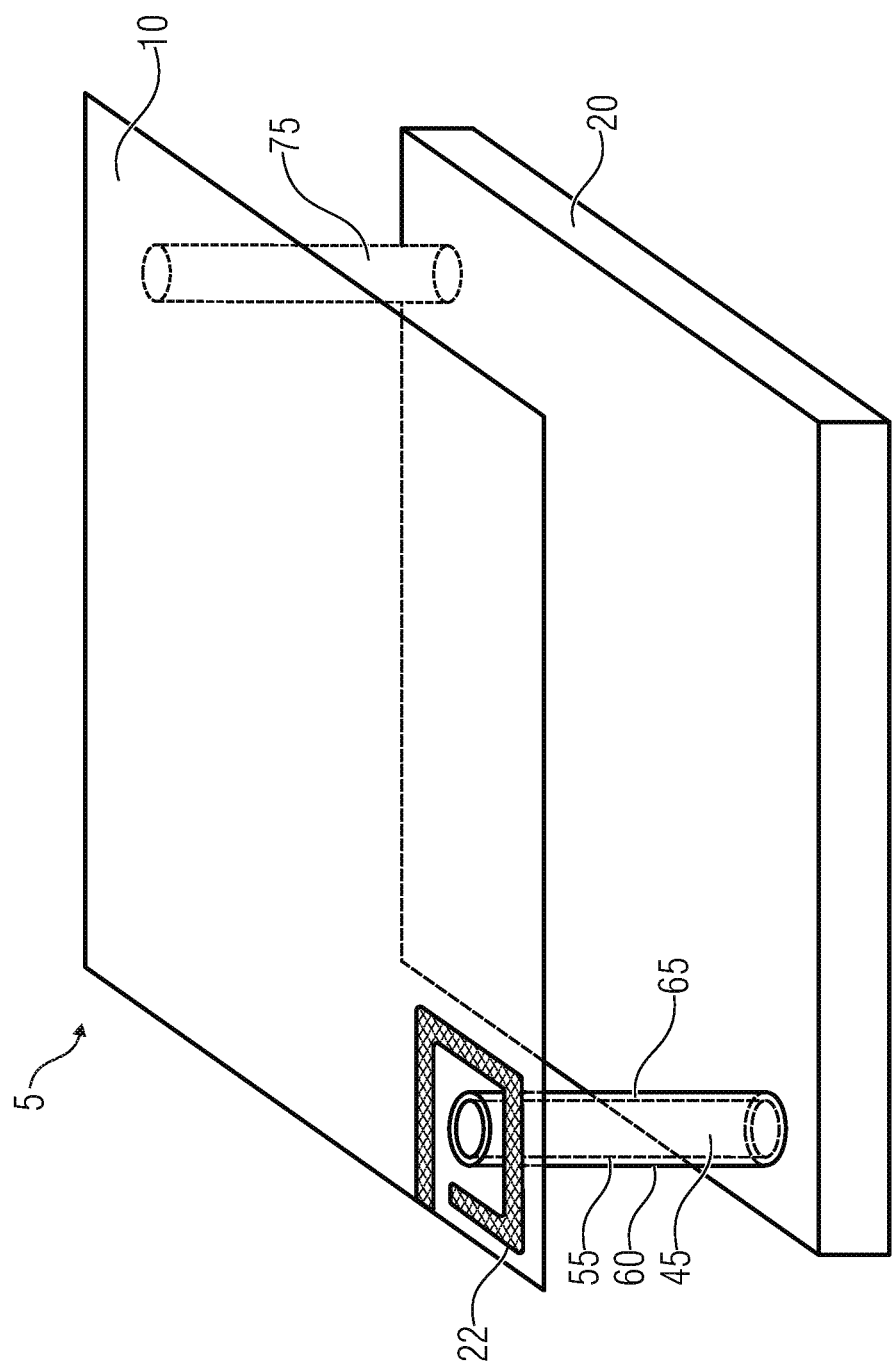
FIG. 5 shows a schematic illustration of a side view of a radiation detector, wherein the membrane is suspended on a spacer by the ridge.

FIG. 5 shows a schematic side view of a radiation detector 5 with a ridge 22. According to the shown embodiment, additionally to the already described thermal insulation of the membrane 10 from the substrate 20 through the spacer 45, the membrane may be suspended on the spacer 45 by a ridge 22. The advantage may be a further improvement of the thermal insulation. Therefore, numerous combination possibilities arise between the spacer design and ridge design, whereby the sensor may be manufactured flexibly. The pixel pitch may be, for example, 17 µm. In this case, the thermal insulation may be realized through the spacer 45 and a conventional ridge 22. The ridge 22 may be in a plane with the membrane 10 and be formed of one or multiple layers, which form the membrane 10. The ridge 22 may be separated from the membrane 10 by a slot 85, except at a position, where the membrane is suspended on the ridge 22. The ridge 22 contacts the spacer 45 at one end and the membrane 10 and the radiation sensor 50, respectively, at another end. Compared with the ridges on conventional spacers, a ridge 22 may be embodied shorter and/or narrower due to the insulation of the spacer 45. The thermal insulation is accomplished mainly through the ridge 45, i.e., the thermal conductance of the ridge 22 is, for example, greater than the thermal conductance of the spacer 45, which is connected to the membrane by the ridge 22. However, it may also occur that the spacer 45 has a greater thermal conductance. As already described, in this embodiment, a further or several further spacers 75 may be provided for stabilizing the membrane 10.

Figure 6:
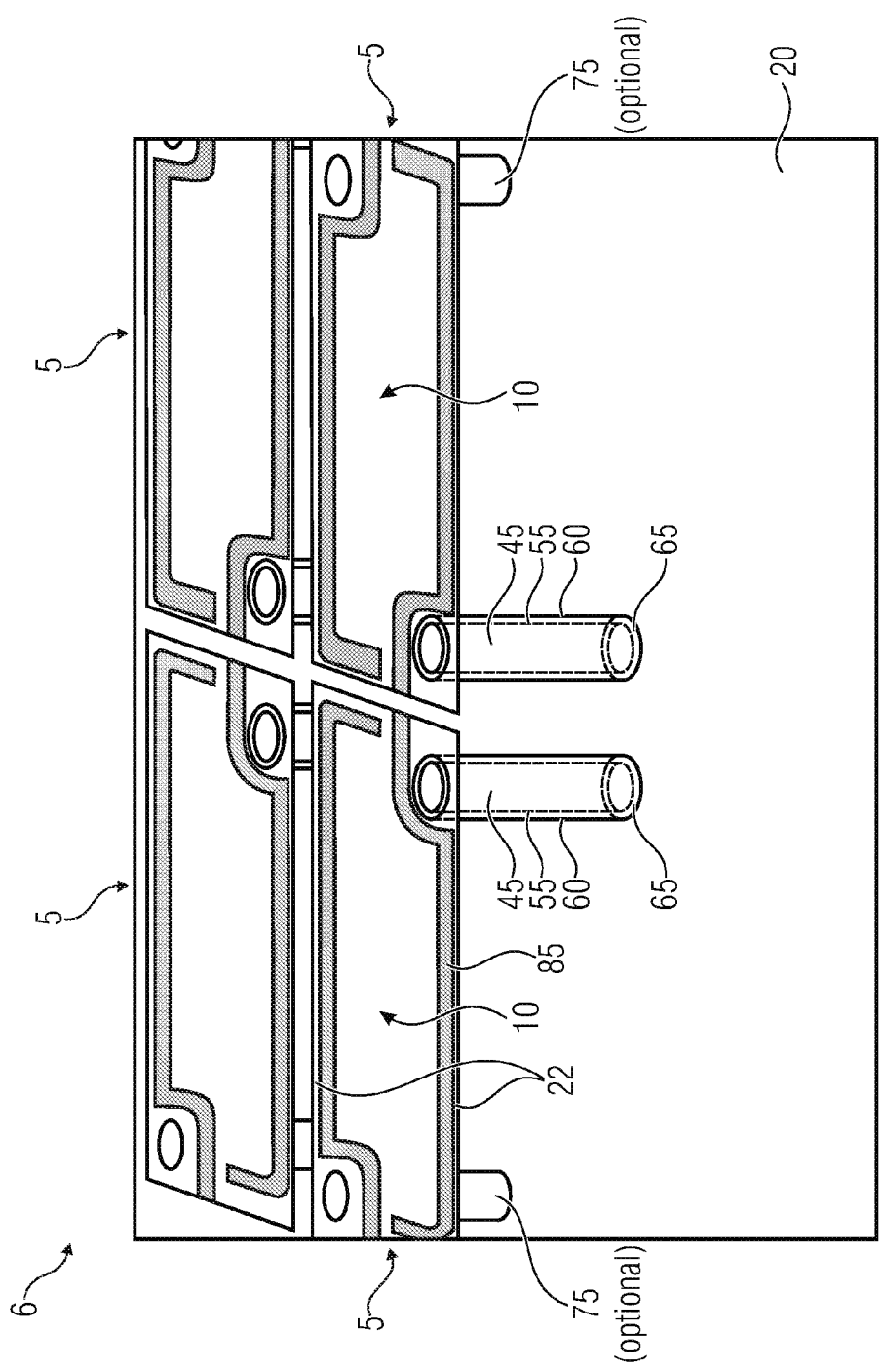
FIG. 6 shows a schematic illustration of a side view of an array of radiation detectors.

FIG. 6 shows an array of radiation sensors 6, which includes four radiation sensors 5 on the substrate 20. The array of radiation sensors 6 may, e.g., form an image sensor for thermal radiation. The membrane 10 is, for example, suspended on the spacer 45 by the ridge 22. The spacer 45 electrically contacts the substrate 20 and thermally insulates both from each other. The further spacers 75 are again optional and may serve for stabilizing the individual radiation sensors 5, for example, to obtain a planar area of the array of radiation sensors 6.

The array of radiation sensor 6 may, for example, detect the intensity of several radiation sources to, for example, create a two-dimensional image. For this, several membranes may be contacted and thermally insulated via a plurality of spacers with one or several substrates. In this arrangement, every radiation detector 5 may represent one pixel of the two-dimensional image. Temperature evaluation circuits, which may, e.g., be disposed in the substrate and may, for example, be below or next to the membrane, may, e.g., be electrically connected to each other, for example, to allow a serial readout, or electrically insulated from each other, for example, to read out the information of the temperature evaluation circuits in parallel.

Figure 7:
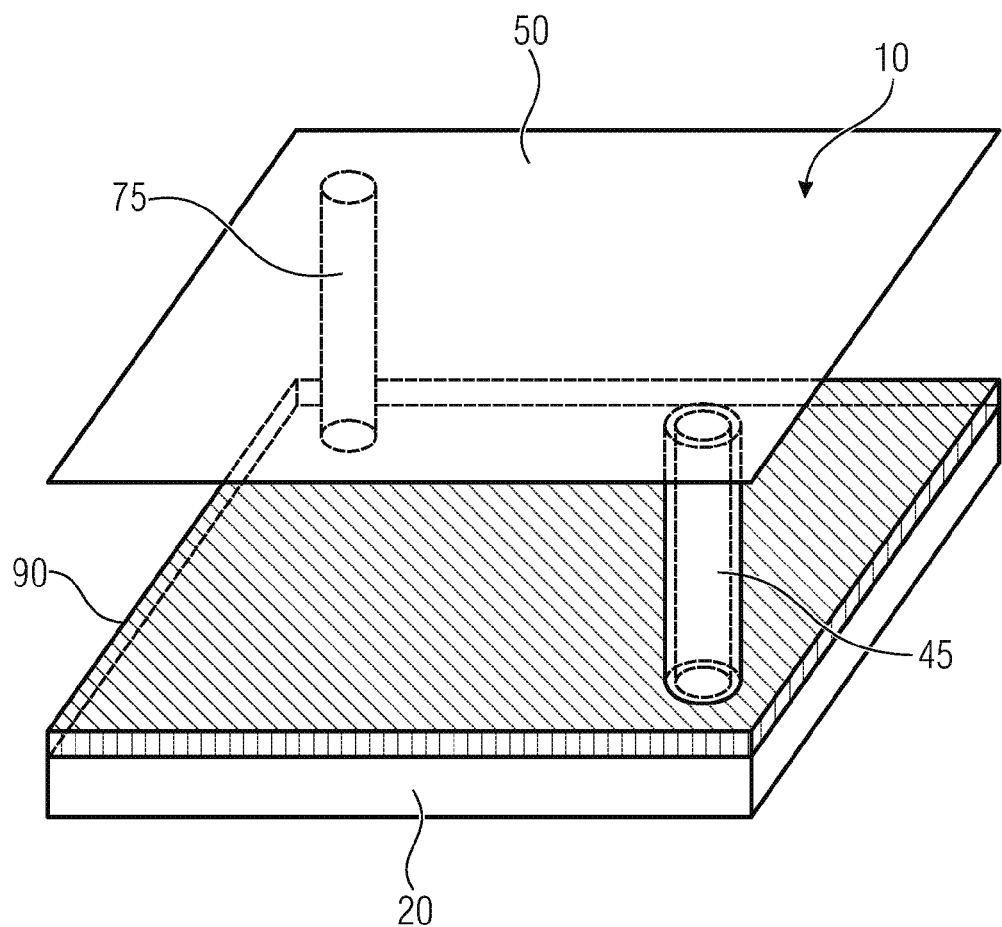
FIG. 7 shows a schematic illustration of a side view of a radiation detector, wherein the membrane is suspended on a substrate by spacers and the spacers are stabilized through an oxide layer.

FIG. 7 shows another embodiment similar to the embodiment of FIG. 4. For stabilizing the spacer 45 and optionally further spacers 75 for stabilizing the membrane 10 and/or for suspending the reflector 35, before applying the sacrificial layer, an oxide layer 90 may be applied to the substrate, which is very selective to the sacrificial material during the final etching. If the sacrificial layer is removed, the oxide layer 90 remains and additionally stabilizes the spacers.

Figure 8A:
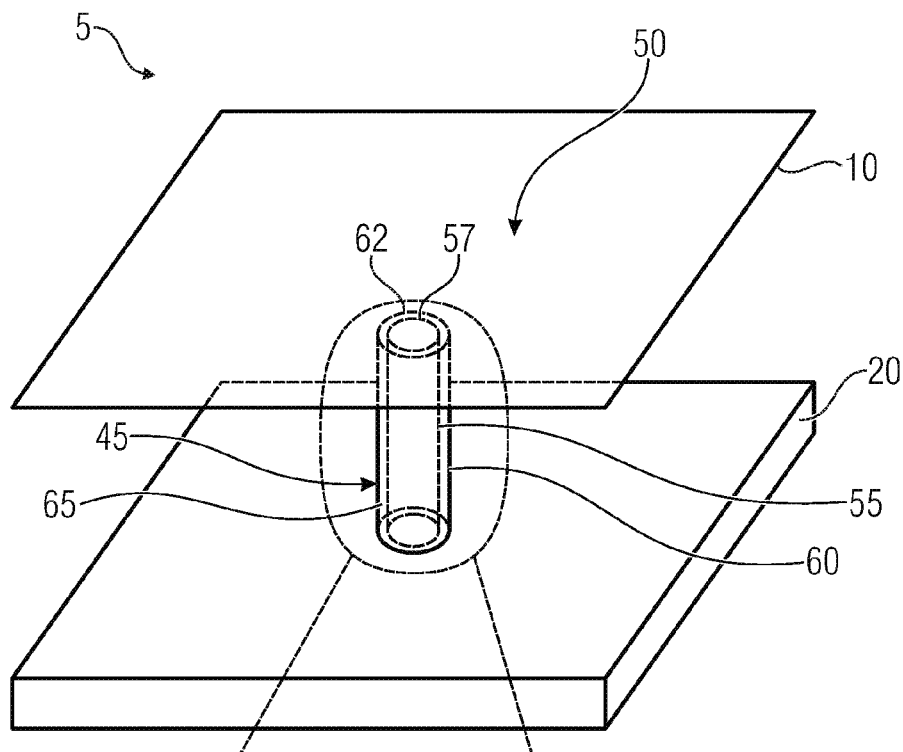
FIG. 8a shows a schematic illustration of a side view of a radiation detector as shown in FIG. 1.

FIG. 8a shows a radiation detector 5, as it is also illustrated in FIG. 1. In the following, the spacer 45 and the shape of the spacer 45, respectively, is described in more detail based on FIGS. 8b-e.

Figure 8B:
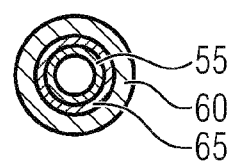
FIG. 8b is a schematic illustration of a lateral section through a round spacer, which is hollow on the inside.

FIG. 8b shows a schematic illustration of a lateral section through the round spacer 45, which is hollow on the inside. The electrically conducting layer 55 as well as the electrically conducting layer 60 may connect two poles of the substrate 20 with two poles of the membrane 10. The layer 65 may insulate both the two electrically conductive layers 55 and 60 from each other, as well as further, thermally insulate the membrane 10 from the substrate 20. If the electrically conductive layers 50 and 60 are deposited sufficiently thinly, a very low thermal conductance may be achieved through this arrangement.

Figure 8C:
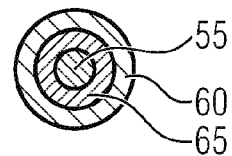
FIG. 8c is a schematic illustration of a lateral section through a round spacer, which is not hollow on the inside.

FIG. 8c shows a schematic illustration of a lateral section through a round spacer, which is not hollow on the inside. The arrangement in FIG. 8c is comparable with the arrangement in FIG. 8b, however, the process of depositing the layer 55 and the coating, respectively, is not stopped as soon as a layer 55 is deposited on the layer 65, but is continued until the layer 55 does no longer comprise any hollow space on the inside. This arrangement may allow for an increased strength of the spacer 45.

Figure 8D:
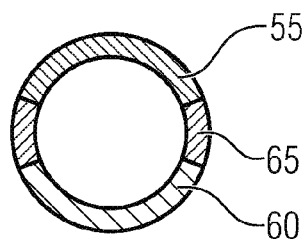
FIG. 8d is a schematic illustration of a lateral section through a round spacer, which is hollow on the inside, wherein two contacts are guided in an annulus.

FIG. 8d shows a schematic illustration of a lateral section through a round spacer, which is hollow on the inside, wherein two contacts are guided in an annulus. The layers 55 as well as the layer 60, respectively, take up a section of an annulus, wherein the electrically insulating layer 65 electrically insulates the two sub rings 55 and 60 from each other between the part rings.

Figure 8E:
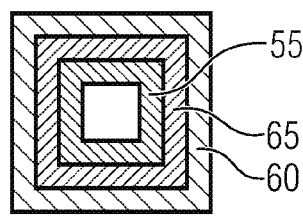
FIG. 8e is a schematic illustration of a lateral section through a rectangular spacer, which is hollow on the inside.

FIG. 8e shows a schematic illustration of a lateral section through a rectangular spacer, which is hollow on the inside. This embodiment is similar to the embodiment of FIG. 8b, wherein the layers 55, 60, 65 are embodied rectangularly and not roundly. Further, this illustration shows that, beside the shown round spacer 45, any further arbitrary shapes of the spacer 45 are also possible. Further, one or several protection layers may be applied on the outside and/or if possible on the inside.

Figure 9:
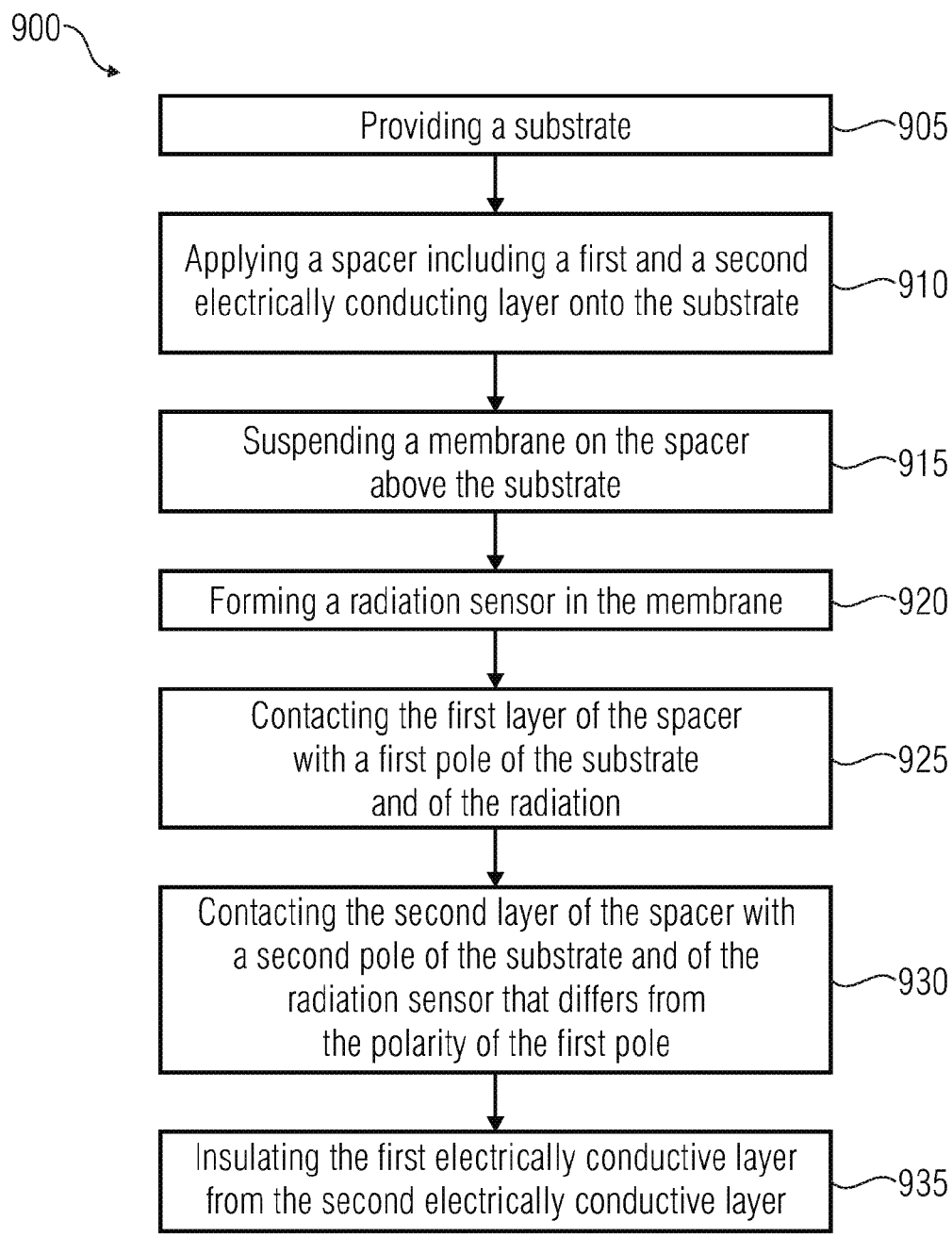
FIG. 9 is a schematic block diagram of a method for manufacturing a radiation detector.
Figure 10:
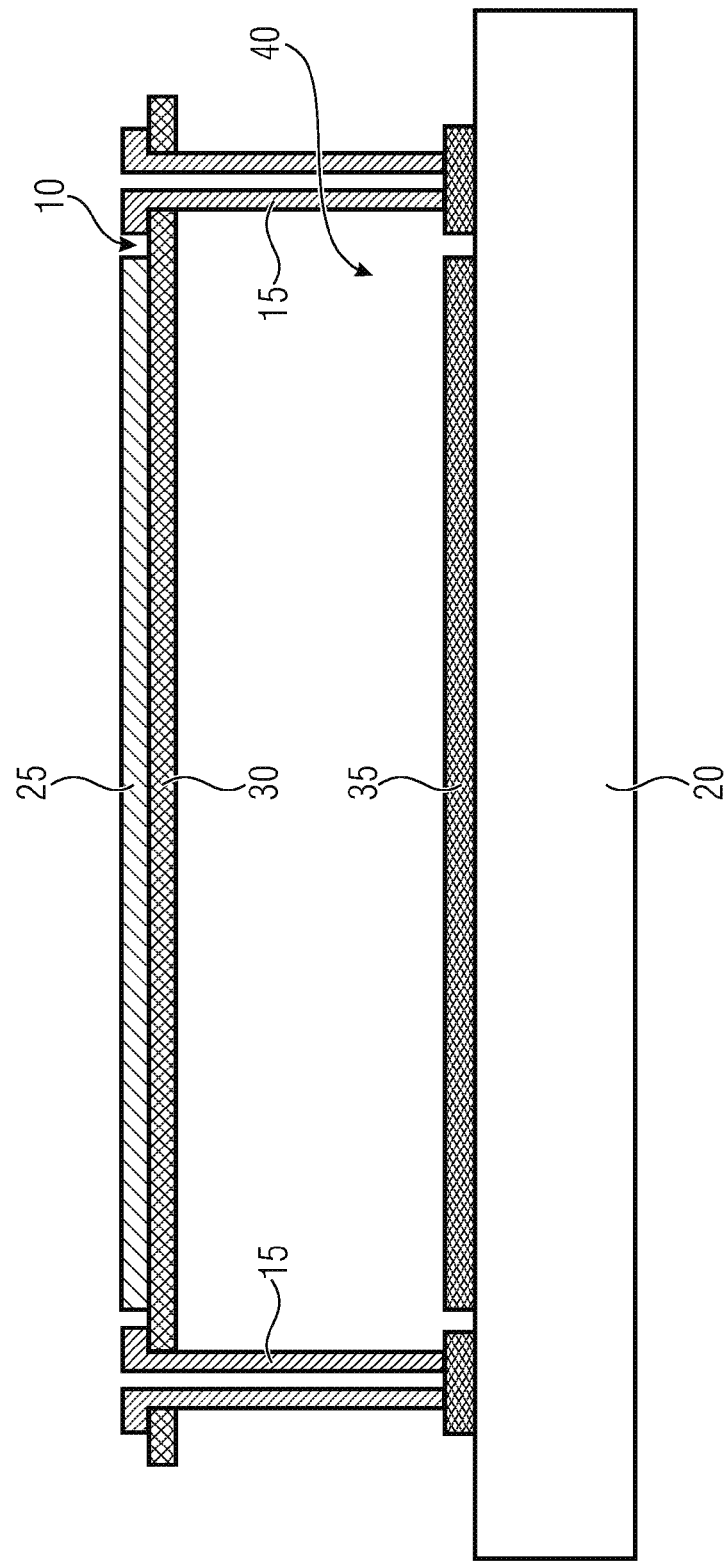
FIG. 10 shows a schematic illustration of a known microbolometer.
Figure 11:
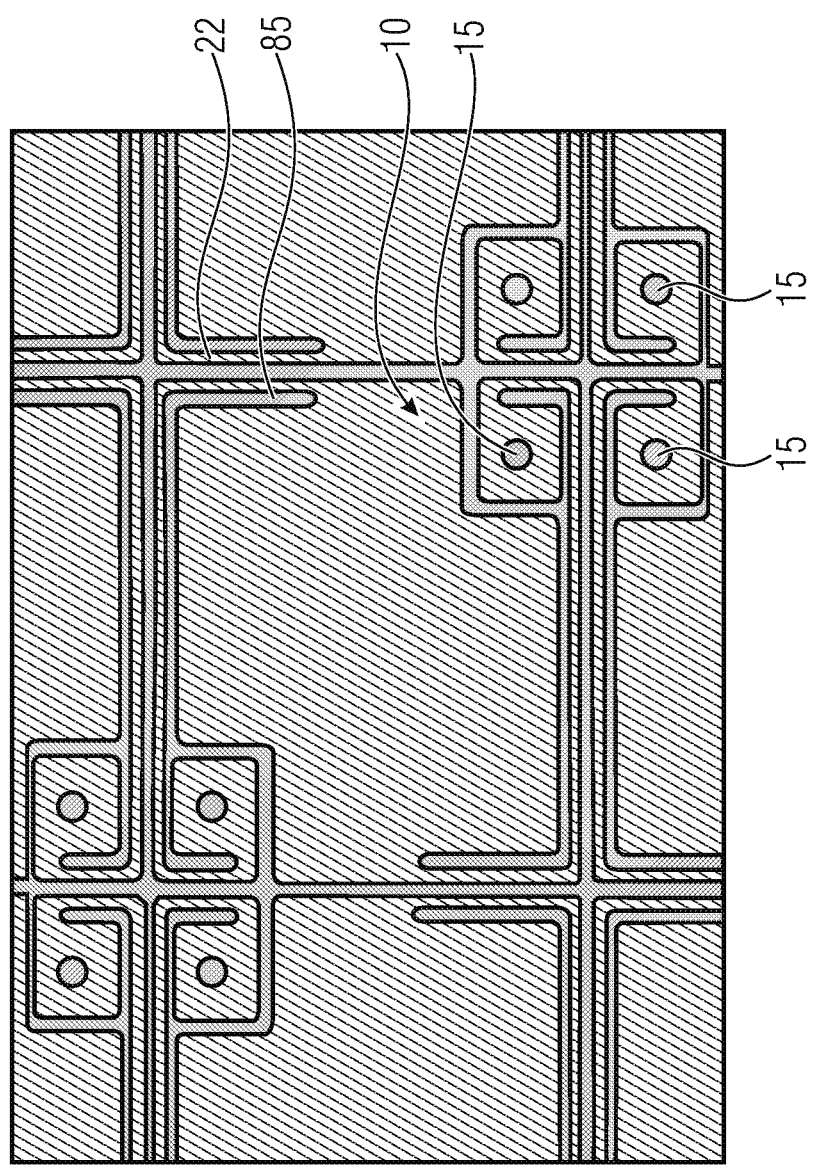
FIG. 11 shows a schematic illustration of a top view of a known membrane, wherein the membrane is suspended by ridges on metal contacts.

FIG. 9 shows a schematic block diagram of a method 900 for manufacturing a radiation detector 5 with a step 905 "providing the substrate 20", a step 910 "applying a spacer 45, which includes a first and a second electrically conductive layer 55, 60, onto the substrate", a step 915 "suspending the membrane 10 on the spacer 45 above the substrate 20", a step 920 "forming a radiation sensor 50 in the membrane 10", a step 925 "contacting the first layer 55 of the spacer 45 with a first pole 57 of the substrate and of the radiation sensor 50", a step 930 "contacting the second layer 60 of the spacer 45 with a second pole 62 of the substrate 20 and radiation sensor 50 that differs from the polarity of the first pole 57" and a step 935 "insulating the first electrically conductive layer 55 from the second electrically conductive layer 60".

In other words, the spacer 45 may be manufactured by means of a sacrificial layer process. Thereby, initially, a hole may be etched into the sacrificial layer and subsequently be coated. For example, for etching the hole, the so-called Bosch process may be used, since the same enables generating steep edge angles at high aspect ratios. The layers may be deposited by means of atomic layer deposition ALD so that, even for the mentioned steep edge angles, the etched holes may be covered, i.e., the whole area of the hole that is etched into the sacrificial layer may be evenly thinly coated. In this case, the tolerance may be less than 50 nm. Alternatively, the tolerance may also be smaller than 25 nm or less than 5 nm. Further, the deposited layers may be structured according to the manufacturing process. Finally, the sacrificial layer is removed so that the manufactured spacer is self-supporting. Contrary to often shown arrangements of the spacer 45 in a corner of the membrane 10, the same may also be disposed at other positions, e.g., centered between the edges. Further, it is also possible to realize further spacers 75, for example, from a thermally insulating material, e.g. an oxide such as aluminum oxide, as an additional support for mechanical stabilization, while the same do not have any electrical functionality.

Due to invention described herein, it is possible to maximize the relative area proportion of the absorber at a given pixel pitch, as lateral ridges, which were so far a main part of the thermal insulation, may be omitted entirely and significantly reduced, respectively. This space saving may be used to, e.g., expand the effective absorber area. The thermal insulation may be flexibly adapted according to Eq. 4 via the individual layer thicknesses, the base radius and the length of the spacer 45. The respective maximum is limited by the stability of the spacers 45 and the resonator condition. Therefore, it is even possible to achieve a significantly smaller corresponding thermal conductance than possible with the ridges to date. Due to both these factors, the performance of radiation detectors, for example current microbolometers, may be raised significantly. The advantages of a very large absorber area and sensor area, respectively, and, at the same time, a good thermal insulation may also result in an enormous benefit, especially, when scaling the pixel pitch to smaller values. Due to the smaller dimensions, the spacers may also be inferred to as nanotubes. They allow for an enlargement of the available absorber area while maintaining the thermal conductance by a reduction of the ridge area, wherein the thermal conductance is, at the same time, independently adaptable.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Radiation detector comprising a substrate and a membrane, which is suspended above the substrate by a spacer,
    wherein the spacer thermally insulates a radiation sensor, which is formed in the membrane, from the substrate;
    wherein the spacer comprises a first layer, which is electrically conducting and contacts a first pole of the radiation sensor and of the substrate;
    wherein the spacer comprises a second layer, which is electrically conducting and electrically insulated from the first electrically conductive layer and contacts a second pole of the radiation sensor and of the substrate, wherein the second pole differs in polarity from the first pole,
    wherein the radiation sensor is a temperature-dependent electrical resistor or a temperature-dependent capacitance or a temperature-dependent inductivity or a diode.

2. Radiation detector according to claim 1, wherein the spacer is configured to predominantly thermally insulate the membrane from the substrate.

3. Radiation detector according to claim 1, wherein the first layer, which is electrically conducting, electrically contacts the first pole in a first metallization plane of the substrate and wherein the second layer electrically contacts the second pole in a second metallization plane.

4. Radiation detector according to claim 1, wherein the spacer comprises a third layer, which is disposed between the first and the second layer, wherein the third layer electrically insulates the first layer from the second layer.

5. Radiation detector according to claim 4, wherein the third layer comprises an oxide.

6. Radiation detector according to claim 4, wherein the maximum layer thickness of the first, second or third layers is smaller than or equal to 1 µm.

7. Radiation detector according to claim 1, wherein the membrane is ridgelessly suspended on the spacer.

8. Radiation detector according to claim 1, wherein a reflector is disposed between the substrate and the membrane.

9. Radiation detector according to claim 8, wherein the reflector comprises a metal layer.

10. Radiation detector according to claim 8, wherein the distance between the reflector and the membrane is an odd, integer multiple of a quarter of a main wavelength that is to be detected.

11. Radiation detector according to claim 1, wherein the spacer is manufactured by means of ALD in the sacrificial layer method.

12. Radiation detector according to claim 1, wherein the first and/or the second layer comprises TiN, Ti, Cu, W, Sn, Ni, Au, Al or a combination thereof.

13. Radiation detector according to claim 1, wherein a cross-section area of the spacer is smaller than or equal to 7 µm² or smaller than or equal to 3 µm² or smaller than or equal to 0.8 µm² over a total length.

14. Radiation detector according to claim 1, wherein a length of the spacer between membrane and substrate is smaller than or equal to 100 µm.

15. Radiation detector according to claim 1, wherein a length of the spacer between membrane and substrate is greater than or equal to 0.4 µm.

16. Radiation detector according to claim 1, wherein the ratio of a length to a width of the spacer is larger than or equal to 10 or larger than or equal to 5 or larger than or equal to 1.

17. Radiation detector according to claim 16, wherein the layer thickness varies over a total length of the spacers between substrate and membrane by less than 50 nm or less than 25 nm or less than 5 nm.

18. Radiation detector according to claim 1, wherein the substrate comprises a temperature evaluation circuit.

19. Radiation detector according to claim 1, wherein the radiation detector is a bolometer.

20. Array of radiation detectors according to claim 1.

21. Radiation detector according to claim 1, wherein the radiation detector further comprises a ridge running in a lateral direction, by which the membrane is suspended on the spacer and which increases an insulation of the membrane from the substrate through the spacer and electrically contacts the radiation sensor.

22. Radiation detector comprising a substrate and a membrane, which is suspended above the substrate by a spacer, wherein the spacer thermally insulates a radiation sensor, which is formed in the membrane, from the substrate; wherein the spacer comprises a first layer, which is electrically conducting and contacts a first pole of the radiation sensor and of the substrate; wherein the spacer comprises a second layer, which is electrically conducting and electrically insulated from the first electrically conductive layer and contacts a second pole of the radiation sensor and of the substrate, wherein the second pole differs in polarity from the first pole, and wherein the membrane is suspended on the spacer by a ridge, wherein the thermal insulation of the membrane from the substrate is predominantly accomplished by the spacer.

23. Radiation detector comprising a substrate and a membrane, which is suspended above the substrate by a spacer,
wherein the spacer thermally insulates a radiation sensor, which is formed in the membrane, from the substrate;
wherein the spacer comprises a first layer, which is electrically conducting and contacts a first pole of the radiation sensor and of the substrate;
wherein the spacer comprises a second layer, which is electrically conducting and electrically insulated from the first electrically conductive layer and contacts a second pole of the radiation sensor and of the substrate, wherein the second pole differs in polarity from the first pole,
wherein the radiation detector further comprises a ridge running in a lateral direction, by which the membrane is suspended on the spacer and which increases an insulation of the membrane from the substrate through the spacer and electrically contacts the radiation sensor.

24. Method for manufacturing a radiation detector comprising:
providing a substrate;
applying a spacer, comprising a first and a second electrically conductive layer, onto the substrate;
suspending a membrane on the spacer above the substrate;
forming a radiation sensor in the membrane;
contacting the first layer of the spacer with a first pole of the substrate and of the radiation sensor;
contacting the second layer of the spacer with a second pole of the substrate and of the radiation sensor, which differs in polarity from the first pole;
insulating the first electrically conductive layer from the second electrically conductive layer,
wherein the radiation sensor is a temperature-dependent electrical resistor or a temperature-dependent capacitance or a temperature-dependent inductivity or a diode.

* * * * *